R. BOEKLEN.
Apparatus for Emptying Sewers and Sinks.
No. 167,384. Patented Sept. 7, 1875.
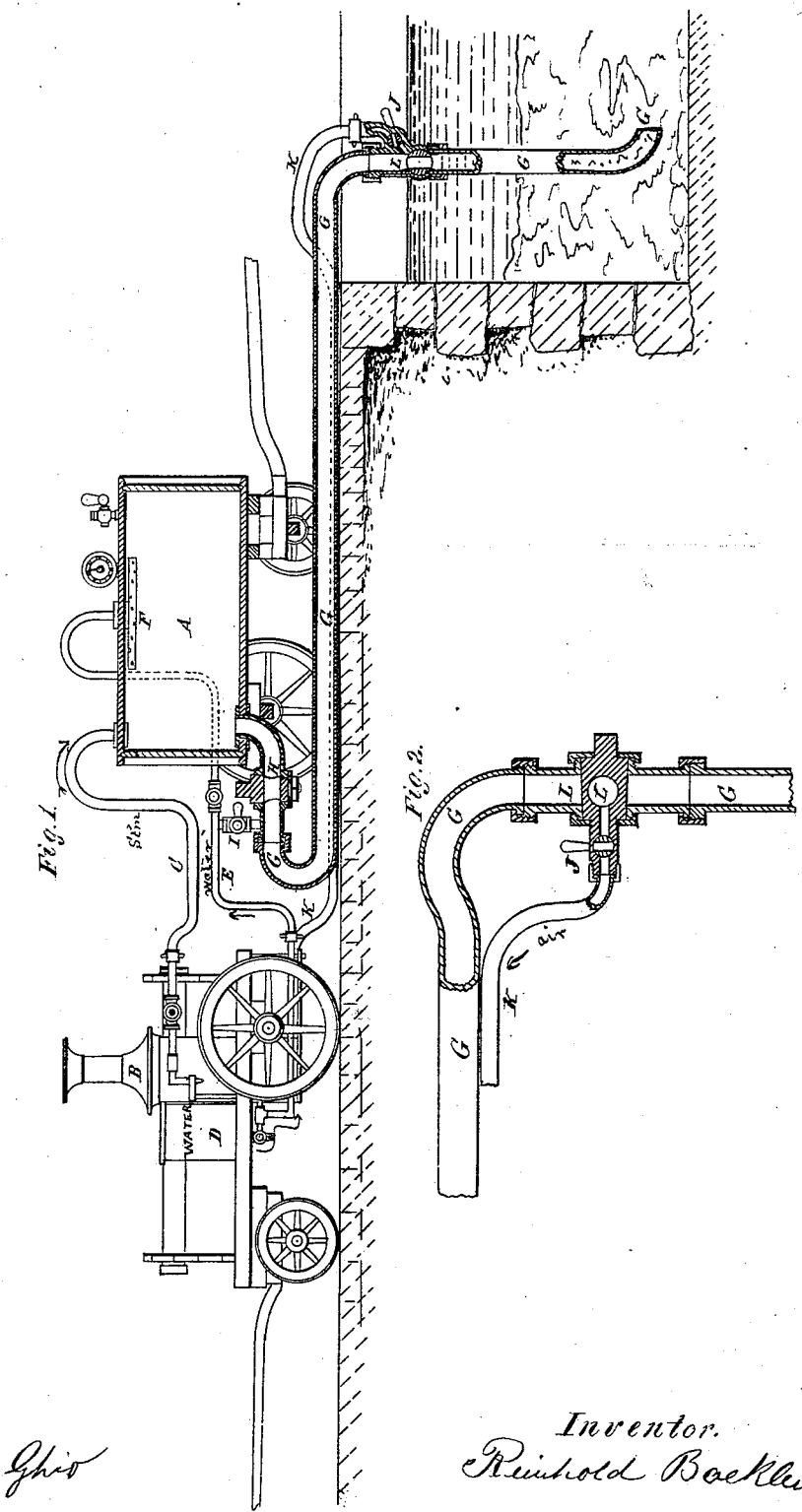

UNITED STATES PATENT OFFICE.

REINHOLD BOEKLEN, OF BROOKLYN, NEW YORK.

IMPROVEMENT IN APPARATUS FOR EMPTYING SEWERS AND SINKS.

Specification forming part of Letters Patent No. 167,384, dated September 7, 1875; application filed July 13, 1875.

*To all whom it may concern:*

Be it known that I, REINHOLD BOEKLEN, of the city of Brooklyn, in the county of Kings and State of New York, have invented certain new and useful Improvements in Apparatuses for Emptying Sewers and Sinks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates particularly to an apparatus for emptying water-closets, vaults, and cellars, and removing night-soil and other similar matter, and for dredging purposes for which Letters Patent were granted to me August 26, 1873; and the nature of my invention consists in the construction and novel arrangement of the hose through which the contents of the sink, &c., is passed into the reservoir or tank, with an air-pipe and stop-cock, and in the combination of parts, as will be hereinafter more fully set forth.

In the annexed drawing, Figure 1 is a side elevation of my improved apparatus, the tank and hose being in longitudinal section. Fig. 2 is an enlarged longitudinal section of the end portion and mouth of the suction-pipe or hose.

A represents the receiving tank or vessel, and B the steam-boiler, both of which may be mounted on wheels, as shown, or on vessels for dredging, or be made portable, as desired, and they are connected by means of the pipe C, which conveys steam from the boiler to the tank. In the top of the tank A is a sprinkler, F, connected with the water-supply D by a pipe, E, and this pipe is by a pipe and stop-cock, I, connected with the inlet-pipe G of the tank, in order to supply said inlet-pipe with water. Between the pipe I and the tank in the pipe G is a stop-cock, H. The mouth or entrance of the hose or suction pipe G in the soil to be removed is made smaller than the body of the pipe, so that any substance that can enter the pipe will have a free passage through the same.

At or near a point on the pipe G, level with the top of the substance or material to be operated, is a branch pipe, K, with valve or stop cock J, through which the air contained in the pipe G and tank A may be carried off, so that both may be fully charged with steam. The air may be carried through the pipe K, to the furnace of the boiler, or to a vessel containing some disinfectant to purify the air and make it odorless.

The lower part of the suction-pipe G is preferably made in sections, as shown in Fig. 2, so that it may be arranged to operate in places of considerable depth, and it is provided with a stop-cock, L, which is to be closed after all the air has been expelled to allow the steam to condense by the aid of the cold water from the sprinkler F, and, if required, from the stop-cock I. By these means the condensation is very rapid, and a vacuum produced or obtained. By now opening the stop-cock L, and closing the water-supplies, the whole power of the atmospheric pressure is allowed to act instantaneously upon the soil to be removed, thereby causing the same to move very rapidly into the tank, allowing no time for the fluid parts to pass through the more dense, but causing both to be moved at the same time, and filling the tank rapidly.

It is well known that in removing soil consisting of mixed fluid and solid matter, by a vacuum, the fluid portions are apt to pass through the more dense part, leaving the latter behind, and this is owing to having air in the suction-pipe, and producing the vacuum gradually or partially. This is entirely overcome by my invention, as there is a rapid, concentrated, and instantaneous action from the force of a nearly complete vacuum in the tank.

Having thus fully described my invention, what I claim as new, and desire to secure by Letters Patent, is—

1. The combination of the tank A, hose G, and cock or valve J, whereby the vacuum is caused in said tank and hose, in order to operate upon the soil instantaneously, substantially as herein set forth.

2. The combination of the tank A, and boiler B, with the hose G, cocks or valves J L, and steam-pipe C, substantially as and for the purposes herein set forth.

3. The combination of the boiler B, tank A, sprinkler F, valve or cock J, pipe K, and hose G, to operate upon the soil, substantially as herein set forth.

In witness whereof I hereunto set my hand this 13th day of July, 1875.

REINHOLD BOEKLEN.

In presence of—
 AGASTINO B. GHIO,
 P. C. DIETERICH.